(12) United States Patent
Saito et al.

(10) Patent No.: US 6,251,206 B1
(45) Date of Patent: Jun. 26, 2001

(54) METHOD FOR OPENING AND RESIN-IMPREGNATION TO PRODUCE CONTINUOUS FIBER-REINFORCED THERMOPLASTIC RESIN COMPOSITE MATERIAL

(75) Inventors: Koichi Saito; Rikio Yonaiyama, both of Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/093,784

(22) Filed: Jun. 9, 1998

(30) Foreign Application Priority Data

Jun. 10, 1997 (JP) .................................................... 9-168164

(51) Int. Cl.⁷ ...................................................... B32B 31/00
(52) U.S. Cl. ........................... 156/180; 156/166; 118/124; 425/114; 427/434.4; 427/434.6
(58) Field of Search ..................................... 156/166, 180, 156/433; 425/114; 118/124; 427/434.4, 434.5, 434.6

(56) References Cited

U.S. PATENT DOCUMENTS

| | | |
|---|---|---|
| 4,549,920 | 10/1985 | Cogswell et al. . |
| 4,559,262 | 12/1985 | Cogswell et al. . |
| 4,883,625 | 11/1989 | Glemet et al. . |
| 4,957,422 | 9/1990 | Glemet et al. . |
| 5,019,450 | 5/1991 | Cogswell et al. . |
| 5,213,889 | 5/1993 | Cogswell et al. . |
| 5,268,050 | * 12/1993 | Azari ................................ 425/114 X |
| 5,529,652 | * 6/1996 | Asai et al. ........................ 425/114 X |

FOREIGN PATENT DOCUMENTS

| | | |
|---|---|---|
| 63-37694 | 7/1988 | (JP) . |
| 63-264326 | 11/1988 | (JP) . |
| 3-183531 | 8/1991 | (JP) . |
| 5-50432 | * 3/1993 | (JP) . |
| 97/19805 | * 6/1997 | (WO) . |

* cited by examiner

Primary Examiner—Jeff H. Aftergut
(74) Attorney, Agent, or Firm—Wenderoth, Lind, & Ponack, L.L.P.

(57) ABSTRACT

An opening and resin-impregnation apparatus is used for impregnating a reinforcing fiber bundle (2) with a molten resin. The fiber bundle (2) is subjected to opening by bringing it into contact with opening pins (4). An auxiliary pin (5) is positioned within a specific region relative to the opening pin. The apparatus and a method which makes use of the apparatus permit the production of a continuous fiber-reinforced thermoplastic resin composite material having excellent impregnation characteristics and flexural strength while maintaining high stable productivity.

1 Claim, 4 Drawing Sheets

METHOD FOR OPENING AND RESIN-IMPREGNATION TO PRODUCE CONTINUOUS FIBER-REINFORCED THERMOPLASTIC RESIN COMPOSITE MATERIAL

INDUSTRIAL FIELD OF APPLICATION

The present invention relates to an apparatus for opening and resin-impregnation for producing a thermoplastic resin composite (or composite material) reinforced with long fibers (continuous fibers) which are substantially unidirectionally aligned, by passing a reinforcing fiber bundle through an impregnation zone of the apparatus for opening and resin-impregnation while bringing the fiber bundle into contact with the surface of opening pins arranged within the impregnation zone to thus subject the fiber bundle to opening (or to open (loose) the fiber bundle) simultaneously with permeation of a molten resin into spaces formed between the opened bodies obtained from the reinforcing fiber bundle, as well as a method for opening and resin-impregnation of the reinforcing fiber bundle. More specifically, the present invention pertains to an apparatus for opening and resin-impregnation which is provided with an auxiliary pin annexed to the opening pin and placed in a specific position in which the auxiliary pin does not come in contact with the continuous fiber bundle, as well as a method for opening and resin-impregnation of the reinforcing fiber bundle.

PRIOR ART

There has already been proposed a method for impregnation which comprises the steps of passing, under the application of a tensile force, reinforcing fiber bundles arranged in a band-like pattern through the surface of a spreader while bringing them into contact with the surface and making a thermoplastic polymer (having a melt viscosity of less than 100 Ns/m$^2$) present within a nip zone formed between the reinforcing fiber bundle and the spreader (Japanese Patent Publication No. 63(1988)-37694).

There has also been proposed a method comprising the step of winding and hooking reinforcing fiber bundles on several rods in a zigzag pattern upon impregnation thereof with a molten resin, wherein the angle of the winding and hooking is specified (Japanese Patent Laid-Open Publication No. 3(1991)-183531).

Moreover, there has been proposed an impregnation method comprising the steps of putting, side by side, or spreading reinforcing fiber bundles in a web-like pattern (identical to a band-like pattern), then coating the bundles with a molten resin and passing them through a zig-zag specific barrier zone in an opening and resin-impregnation apparatus while bringing the bundles into contact with the barriers to thus permeate the molten resin into the space formed between the resulting opened bodies (Japanese Patent Laid-Open Publication No. 63(1988)-264326).

The foregoing various methods would permit, for the resent, the production of a continuous fiber-reinforced thermoplastic resin composite material having excellent resin-impregnation characteristics. However, these methods are still insufficient in the resin-impregnation characteristics when the resulting composite material is pulled out at a high speed. For improving the resin-impregnation characteristics, there have been proposed countermeasures such as increasing the numbers of auxiliary pins and/or barrier zones or setting of the angle of winding and hooking reinforcing fiber bundles at a high level (or increasing of the curvature thereof), but it has been clear that these countermeasures conversely suffer from a problem of easy formation of fluff due to fiber-breakage of the reinforcing fiber bundles.

This would be attributable to the fact that the tension applied to the reinforcing fiber bundle is extremely high and, as a result, individual single fibers constituting the fiber bundle are greatly damaged. This is a quite serious problem since the fluff grows if it is left to stand as it is, soon leads to breakage of the whole fiber bundle, and ultimately this makes the apparatus inoperable.

THE PROBLEMS THAT THE INVENTION IS TO SOLVE

An object of the present invention is to provide an apparatus for opening and resin-impregnation and a method for opening and resin-impregnation of a reinforcing fiber bundle which can eliminate the foregoing various problems associated with the conventional techniques difficult (which are to solve) which can not only considerably improve the resin-impregnation characteristics of a continuous fiber-reinforced thermoplastic resin composite material (hereinafter referred to as "the composite (material) of the present invention"), but also permit continuous operation over a long period of time while ensuring high and stable productivity, even when the composite material is pulled out or taken off at a high speed.

SUMMARY OF THE INVENTION

The inventors of this invention have conducted intensive studies to accomplish the foregoing object of the invention, and have found that it is quite effective for the achievement of the object of the present invention to place, within the apparatus for opening and resin-impregnation, at least one opening pin, which is disposed in a plane (usually a vertical plane) including the course or path of the reinforcing fiber bundle, in a zigzag (staggered) arrangement. An auxiliary pin is placed in a position so that it opposes the opening pin through the reinforcing fiber bundle and does not come in contact with the reinforcing fiber bundle. The present invention has been completed by conducting further investigations based on the finding.

That is, the present invention relates to an apparatus for opening and resin-impregnation in which an auxiliary pin, disposed in addition to (or annexed to) at least one opening pin, is placed in a position where it opposes the opening pin through the reinforcing fiber bundles and does not come in contact with the reinforcing fiber bundles at all. Further, the present invention relates to a method for opening and resin-impregnation which comprises the steps of passing the fiber bundle through a combined system of at least one opening pin and an auxiliary pin, in which the fiber bundle moves between the auxiliary pin disposed in a position free of any contact with the reinforcing fiber bundle and an opening pin placed in a position wherein it comes in contact with the fiber bundle.

DETAILED DESCRIPTION OF THE INVENTION (Continuous Fiber-Reinforced Thermoplastic Resin Composite Material)

The continuous fiber-reinforced thermoplastic resin composite material of the present invention includes, for instance, those having sheet-like, plate-like and rod-like shapes and those having so-called pellet-like shapes obtained by cutting fine rods (having a diameter on the order of about 1 to 3 mm; hereinafter also referred to as "strand (s)") into pieces having a length of 3 to 5 mm. Each required shape may arbitrarily be imparted to the resin composite material by appropriately changing the shape of a shape-determining nozzle of the apparatus for opening and resin-impregnation or incidental facilities therefor.

(Reinforcing Fiber Bundle)

The single fiber constituting the reinforcing fiber bundle used in the present invention includes various fibers, for instance, inorganic fibers such as glass fibers, carbon fibers, metal fibers and fused quartz fibers; and organic polymer fibers such as polyester fibers, in particular, all-aromatic polyester fiber, i.e., fibers of copolycondensates of aromatic dicarboxylic acids and divalent phenols, polyamide fibers, in particular, semi-aromatic polyamide fibers, i.e., (nylon) MXD6 (m-xylylenediamine-adipic acid copolycondensates) fibers and all-aromatic polyamide fibers, i.e., aromatic diamine-aromatic dicarboxylic acid copolycondensate fibers. If these single fibers are thermoplastic organic fibers, it is important that the melting point of the organic fiber is considerably higher than that of the thermoplastic resin (i.e., matrix resin) with which the organic fiber is impregnated.

The reinforcing fiber bundles may comprise the foregoing various kinds of fibers alone or in any combination of at least two of them, but glass continuous fiber bundles are conveniently used because of their excellent reinforcing effect and their easy availability. The glass continuous fiber bundles for reinforcing resins, which have currently been prepared and put on the market, include glass rovings. In general, the glass continuous fiber bundle has an average single fiber diameter ranging from 4 to 30 $\mu$m, the number of bundled filaments (single fibers) generally ranging from 400 to 10000 and a tex number usually ranging from 300 to 20000, and those having an average fiber diameter ranging from 9 to 23 $\mu$m are preferred. It is possible to pass these glass rovings through an impregnation zone after at least two of them are treated in a doubler or at least two of them are arranged side by side.

The glass continuous fiber bundles are preferably subjected to a conventionally known surface treatment in order to impart or improve interfacial adhesion with respect to a thermoplastic resin from the viewpoint of their reinforcing effect.

(Thermoplastic Resin)

The resin with which the reinforcing fiber bundles are impregnated may be any resins so far as they are thermoplastic resins. However, there are currently used crystalline resins such as polyolefin resins, polyamide resins and polyester resins in the usual applications.

Among the foregoing crystalline thermoplastic resins, polyolefin resins have widely been used, because of their excellent quality and low price, in the usual applications.

The term "polyolefin resin" as herein used includes crystalline homopolymers or crystalline copolymers or polymer composition comprising at least two such crystalline polymers and copolymers, which are made by sing $\alpha$-olefin generally having about 2 to 10 carbon atoms, such as ethylene, propylene, 1-butene, 1-pentene, 1-hexene, 4-methyl-1-pentene, 1-octene and 1-decene. Among these polyolefin resins, widely used are polypropylene and crystalline copolymers comprising propylene, as principal monomer units, and other $\alpha$-olefin from a practical standpoint.

Moreover, examples of preferred polyolefin resins also include, from the viewpoint of improvement in the reinforcing effect, modified polyolefinic resins obtained by modifying polyolefinic resins with unsaturated carboxylic acids or acid anhydrides thereof through a graft reaction or mixture of such modified polyolefinic resins with polyolefin resins.

A variety of polyamide resins and thermoplastic polyester resins are adapted for applications which require more higher heat resistance. Examples of such polyamide resins include 6-nylon, 7-nylon, 11-nylon, 12-nylon, 6,6-nylon, 6,7-nylon, 6,10-nylon, 6,12-nylon, 6-/6,6-copolycondensed nylon.

Examples of the foregoing thermoplastic polyester resins are polyethylene terephthalate (abbreviated as "PET"), poly (-1,4-)butylene terephthalate and compositions (or mixtures) thereof.

(Filamentation-Impregnation Apparatus)

The embodiment of the apparatus for opening and resin-impregnation according to the present invention comprises an impregnation zone having a box-like (or tank-like) shape, through which a molten resin flows while retaining a predetermined amount of the molten resin therein. At least one opening pin is disposed in the impregnation zone to simultaneously open reinforcing fiber bundles and impregnate it with the molten resin by making the fiber bundle pass through the pin while coming in contact therewith. An auxiliary pin which forms a counterpart to the at least one opening pin (or which is annexed to the latter) is disposed in a position where it opposes the opening pin through the reinforcing fiber bundle and is free of any contact with the reinforcing fiber bundle. In general, such an apparatus for opening and resin-impregnation is further provided with an opening for introducing the reinforcing fiber bundle (reinforcing fiber bundle-introduction opening) formed on the upstream end wall or a top board in the impregnation zone. A shape-determining nozzle is positioned on a downstream end wall in the impregnation zone for drawing out or pulling out the reinforcing fiber bundle impregnated with the molten thermoplastic resin from the foregoing impregnation zone. An opening is provided for introducing the molten resin (molten resin-introduction opening), and a molten resin-supply mechanism is connected to the molten resin introducing opening.

(Impregnation Zone)

The aforementioned impregnation zone is, for example, a box-like zone (or tank-like zone) for conducting the molten resin therethrough while retaining a predetermined amount of the resin therein and the zone is particularly preferably provided with a heater to thus raise the temperature of the resin used to a predetermined temperature level of not less than the crystal melting point of the resin and to maintain the temperature of the resin. The impregnation zone is provided with the opening pin, the auxiliary pin, the molten resin-supply port, the reinforcing fiber bundle-introduction opening and the shape-determining nozzle, as will be detailed below.

(Opening Pin) The opening pin is a means for opening and resin-impregnation, and is used as an approximately round rod-shaped member (a rod-like body having an approximately circular cross section) usually called "opening pin". In general, the opening pins are approximately perpendicularly disposed on both side walls of the impregnation zone in such a manner that they in general connect (or bridge) both side walls. It is preferred to use at least two opening pins from the viewpoint of ensuring good resin-impregnation characteristics, and they are desirably and preferrably arranged in a staggered (or zig-zag) pattern within a vertical plane including the path of the reinforcing fiber bundle.

The reinforcing fiber bundle is usually opened by passing the fiber bundle through the opening pins while bringing them into contact with the pins, and simultaneously the opened bundle is impregnated with a molten resin, i.e., the molten resin permeates into the spaces between the single fibers and/or groups each consisting of a part of the single fibers formed from the opening of the fiber bundle. For improving the degree of opening, the number of opening pins may be increased to 5 to 6, or the winding and hooking angle of the reinforcing fiber bundle may be increased up to about not less than 45 deg.

However, the tension applied to the reinforcing fiber bundle (fiber bundle to be subjected to opening) during the treatment increases in proportion to the increase in the resulting friction. As a result, the reinforcing fiber bundle is extremely damaged and easily forms fluff due to breakage of fibers.

The opening pin may be of a freely rotable type or of a nonrotative (fixed) type and has an average diameter, while taking a cylindrical pin as a standard, usually ranging from about 3 to 50 mm and preferably about 6 to 30 mm.

(Auxiliary Pin)

The auxiliary pin incorporated into the apparatus of the present invention is one which serves to hinder the molten resin entrained by the reinforcing fiber bundles and to generate vortexes. Accordingly, the shape or the like is not limited to any specific one, inasmuch as the foregoing functions can be ensured. In other words, the ross section perpendicular to the longitudinal axis of the auxiliary pin is approximately a circle, but the cross section of the pin may likewise be a polygon or a so-called "polygon having rounded corners", i.e., a polygon which is rounded by cutting the corners (or edges).

The auxiliary pin is placed at a position opposed to the opening pin through the reinforcing fiber bundle and the position of the center of the pin is desirably selected as follows, and particularly, from the viewpoint of the fiber bundle-impregnation characteristics.

The center of the auxiliary pin is desirably positioned in a fan-shaped region formed between a straight line drawn from the center of the opening pin which forms a counterpart to the auxiliary pin toward a point on the surface of the opening pin at which the reinforcing fiber bundle begins to come in contact therewith and a straight line drawn from the center of the opening pin toward a point on the surface of the opening pin at which the fiber bundle begins to depart from the surface and positioned in the regions adjacent to and located on both sides of the fan-shaped region, whose central angles are not more than 30 deg.

Moreover, a distance (G) between the opening pin and the auxiliary pin, which form a counterpart to each other, preferably falls within the following range from the viewpoint of improvement in the fiber bundle-impregnation effect:

$$10D \leq G = H - ((Lx/2) + (Rx/2)) \leq 500D$$

wherein H represents the distance between the centers of the opening pin and the auxiliary pin which form a counterpart to each other; Lx an average diameter of the opening pins; Rx an average diameter of the auxiliary pins; D an average diameter of the single fibers constituting the reinforcing fiber bundle; x the number of the opening pins or that of the corresponding auxiliary pins, such as a, b, c, in this respect, a plurality of x's appearing simultaneously means the same number.

The auxiliary pin is preferably a fixed type, or it is preferably nonrotatably fitted to the apparatus. The average diameter thereof is in general selected so as to fall within a range of from 3 to 50 mm, and preferably 6 to 30 mm, as expressed in terms of the diameter of the most commonly used round rod-shaped pin.

The relative magnitudes of the diameter of the auxiliary pin (Rx: diameter) and that of the opening pin (Lx) preferably satisfy the following relation, and this condition permits or ensures substantial improvement in the fiber bundle-impregnation effect:

$$0.5 \ Lx \leq Rx \leq 1.5 \ Lx \tag{2}$$

wherein Lx represents an average diameter of the opening pins and Rx represents an average diameter of the auxiliary pins.

By way of precaution, the passage "a plurality of x simultaneously appeared means the same number" means that if x of Lx is set at a, x of Rx is also restricted to a.

(Molten Resin-Supply Mechanism)

The molten resin-supply mechanism generally used herein is a melt-kneading extruder. Various kinds of extruders can be used and they may be single-screw or twin-screw types. The molten resin is supplied through the molten resin-introduction opening disposed in the impregnation zone. The molten resin-introduction opening is usually formed by perforation of the top board, bottom plate or upstream end wall (upstream side-boundary wall) of the impregnation zone.

(Opening for Introducing Reinforcing Fiber Bundles)

The reinforcing fiber bundle-introduction opening is in general disposed on the upstream end wall or top board in the impregnation zone. When the opening is disposed on the upstream end wall, it is sufficient that the opening has a slit-like shape adapted for an oblong rectangle corresponding to the cross section of the reinforcing fiber bundle or the fiber bundles arranged side by side. On the other hand, when it is disposed on the upstream top board, the opening may of course have a slit-like shape or the like because there is not a fear of any leakage of the molten resin. In most cases, however, the opening may sufficiently be a simple hole having a large diameter.

(Shape-Determining Nozzle)

It is sufficient to determine the shape and the dimension of the shape-determining nozzle depending on the cross section of a desired product to be produced. When producing reinforced columnar products by cutting reinforcing strands (or reinforcing rods) into pieces (or small pieces) having a predetermined length during a later step in the production process, a device provided with several circular nozzles having a diameter usually ranging from about 1 to 3 mm and being horizontally arranged side by side is generally used. (Columnar Products Producing Mechanism) The apparatus for opening and resin-impregnation according to the present invention may further be equipped with a mechanism for taking off the continuous fiber-reinforced thermoplastic resin composite material in the form of a continuous strand and then cutting it into pieces having a predetermined length to thus provide reinforced columnar products (reinforced pellets). The reinforced columnar products have a length usually ranging from 3 to 50 mm. The resulting columnar products may be formed into a variety of shapes by using a molding machine such as an injection molding machine or an extrusion molding machine as a secondary forming means.

(Description of the Invention Based on the Attached Drawings)

Preferred embodiments of the apparatus for opening and resin-impregnation according to the present invention (hereinafter it may be referred to as "the opening and resin-impregnation apparatus of the present invention"), which is used for producing the composite material (thermoplastic resin composite material reinforced with unidirectionally arranged continuous fibers) will more specifically be explained with reference to the accompanying drawings.

Figure 1:
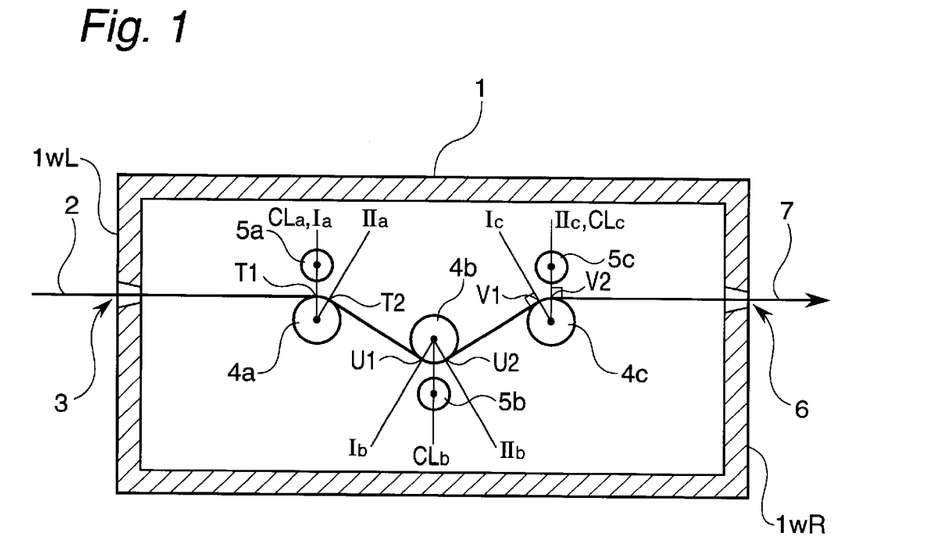
FIG. 1 is a schematic cross sectional view showing a first embodiment of the apparatus for opening and resin-impregnation according to the present invention.

FIG. 1 is a schematic longitudinal sectional view showing an opening and resin-impregnation apparatus (1) according to a first embodiment of the present invention, which is cut by a vertical plane along the course of the reinforcing fiber bundle (a direction along which the composite material is formed). Three opening pins (4a, 4b and 4c) are arranged within the foregoing vertical plane in a zig-zag pattern in the opening and resin-impregnation apparatus (1) according to this embodiment. In addition to the opening pin (4), there are disposed three auxiliary pins (5a, 5b and 5c), each of which opposes to a corresponding opening pin (4) through a reinforcing fiber bundle (2) and which are placed in positions wherein they are free of any contact with the reinforcing fiber bundle (2). The relative position of each auxiliary pin (5a, 5b or 5c) with respect to the corresponding opening pin (4a, 4b or 4c) may be the same, or different.

As the standards for specifying the position of an auxiliary pin (5) with respect to each corresponding opening pin (4), one can define and use a position (contact-starting point: T1) at which the reinforcing fiber bundle (2) begins to come in contact with the surface of the opening pin (4) and a position (separation-starting point: T2) at which the reinforcing fiber bundle (2) begins to depart from the surface of the opening pin (4). More specifically, a straight line (I) drawn from the center of the opening pin (4) toward the position (T1), a straight line (II) drawn from the center to the position (T2) and a straight line (CL) drawn from the center to the center of the auxiliary pin (5) are defined, and when the auxiliary pin (5) is positioned in a region outside the region formed between the straight lines (I) and (II), an angle of intersection θ is defined as an angle formed between the straight line (CL) and either the straight line (I) or (II), which ever is closer to the line (CL).

The foregoing angle "θ" may be represented by "α" for the foregoing auxiliary pin (5a) with respect to the opening pin (4a), "β" for the auxiliary pin (5b) with respect to the opening pin (4b), and "γ" for the auxiliary pin (5c) with respect to the opening pin (4c). According to this nomenclature, the gist of the preceding paragraph may be expressed as follows: these angles α, β and γ may be the same or different.

Figure 2:
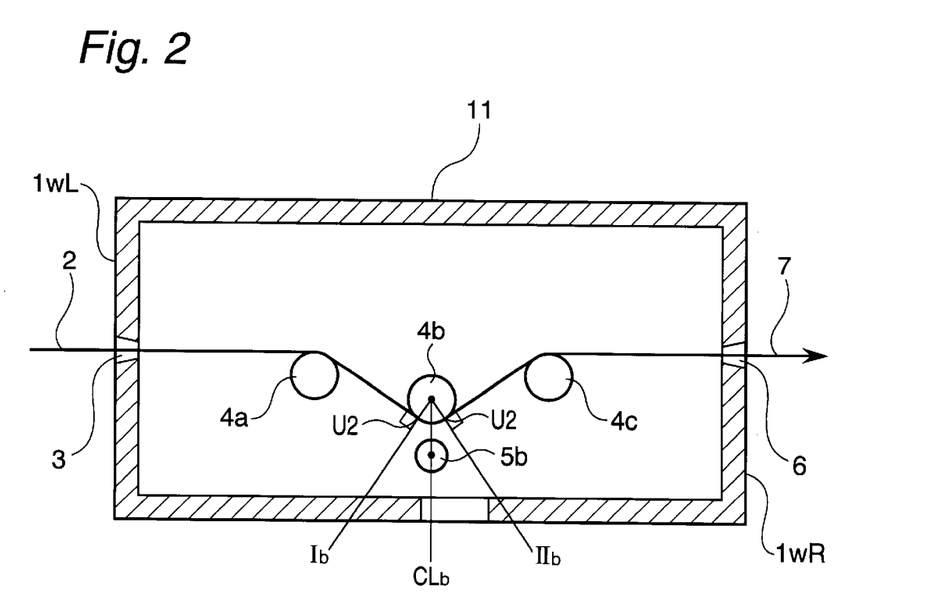
FIG. 2 is a schematic cross sectional view showing a second embodiment of the apparatus for opening and resin-impregnation according to the present invention.

FIG. 2 shows an opening and resin-impregnation apparatus (11) according to a second embodiment of the present invention as will be detailed in Example 2. In FIG. 2, the auxiliary pins (5a) and (5c) are removed from the opening and resin-impregnation apparatus (1) as shown in FIG. 1 and only the auxiliary pin (5b) is retained.

Figure 3:
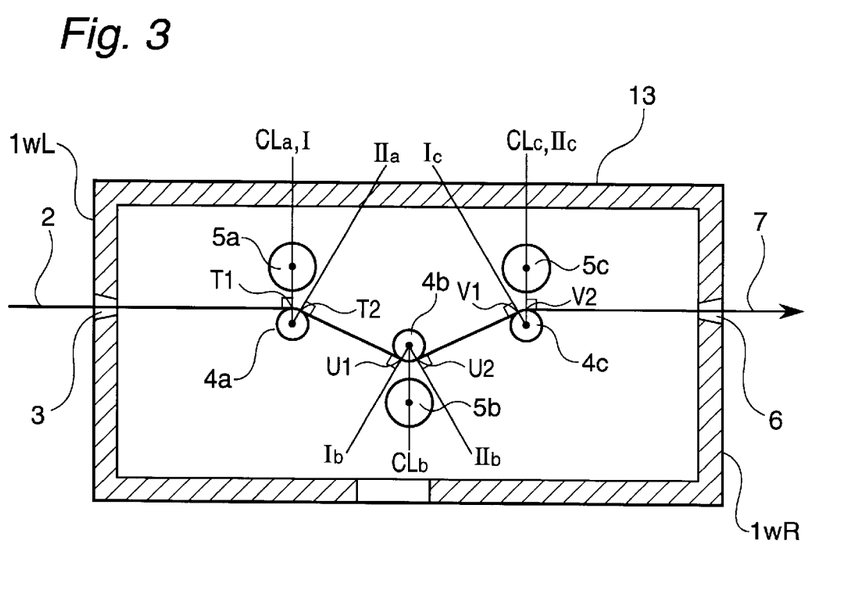
FIG. 3 is a schematic cross sectional view showing a third embodiment of the apparatus for opening and resin-impregnation according to the present invention.

FIG. 3 shows an opening and resin-impregnation apparatus (13) according to a third embodiment of the present invention and. In this embodiment, both the diameter (Lx) of the opening pin (4) and that (Rx) of the auxiliary pin (5) are altered from those shown in FIG. 1 (wherein X represents the number of the opening pin or the auxiliary pin which form a counterpart to the former, such as a, b and c, and a plurality of X's appearing simultaneously represent the same number) and the diameter of the auxiliary pin (5) is greater than that of the opening pin (4) in any set of the opening and auxiliary pins.

Figure 4:
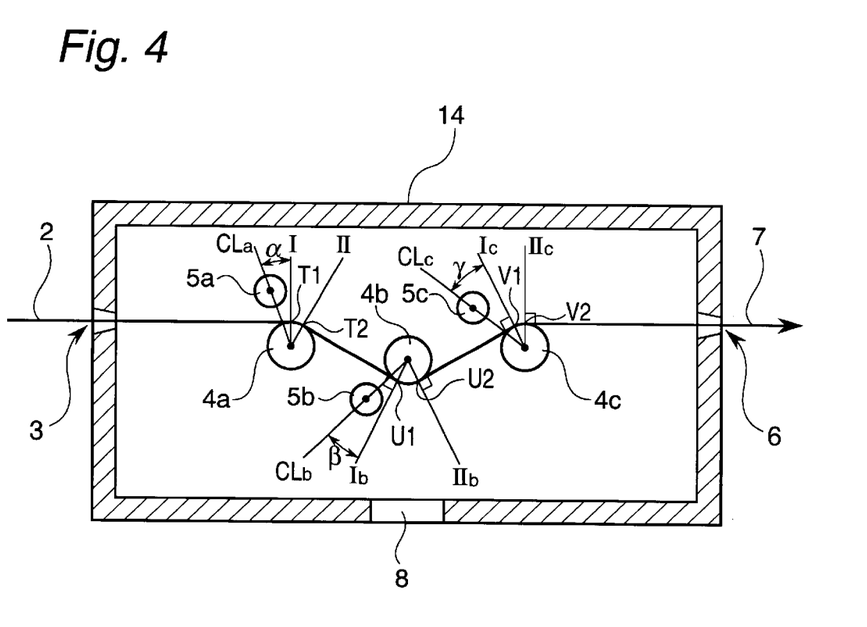
FIG. 4 is a schematic cross sectional view showing a fourth embodiment of the apparatus for opening and resin-impregnation according to the present invention.

FIG. 4 shows an opening and resin-impregnation apparatus (14) according to a fourth embodiment of the present invention as will be detailed in Example 5, in which, as will be shown in this figure, each auxiliary pin (5) is shifted towards the upstream side of the apparatus in any set of the opening and auxiliary pins. More specifically, the displacement of the auxiliary pin (5a) relative to the opening pin (4a) is set at 20 deg. as expressed in terms of the angle (α) formed between the straight line (CLa) and the straight line (Ia), the displacement of the auxiliary pin (5b) relative to the opening pin (4b) is set at 20 deg. as expressed in terms of the angle (β) formed between the straight line (CLb) and the straight line (Ib) and the displacement of the auxiliary pin (5c) relative to the opening pin (4c) is set at 20 deg. as expressed in terms of the angle (γ) formed between the straight line (CLc) and the straight line (Ic).

Figure 5:
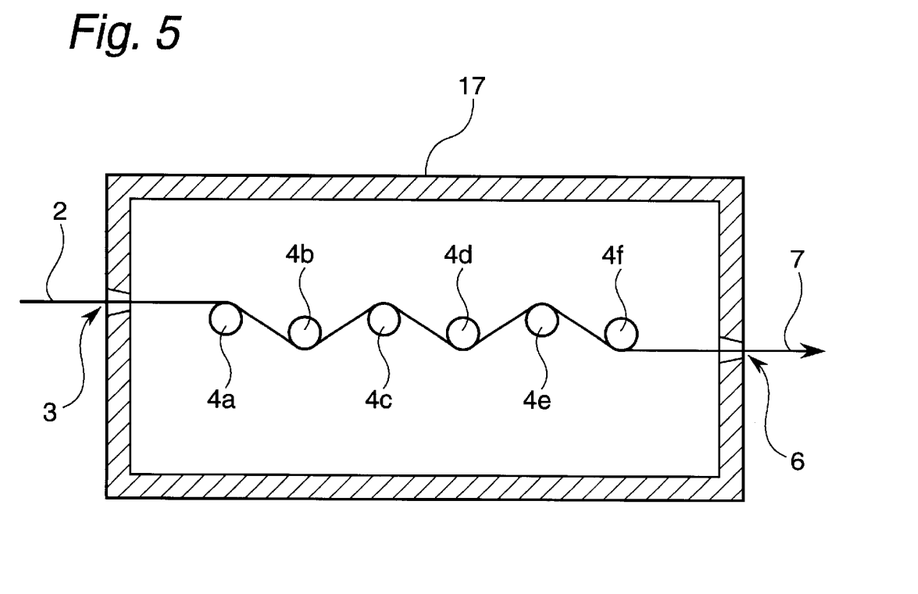
FIG. 5 is a schematic cross sectional view showing the apparatus for opening and resin-impregnation according to a comparative embodiment.

FIG. 5 shows an opening and resin-impregnation apparatus (17) used in Comparative Example 2. The apparatus shown in FIG. 5 is free of any auxiliary pin (5), comprises 6 opening pins (4a to 4f) as the opening pin (4), and these 6 pins are arranged in a zig-zag pattern with respect to the course of the reinforcing fiber bundle in the apparatus.

Figure 6:
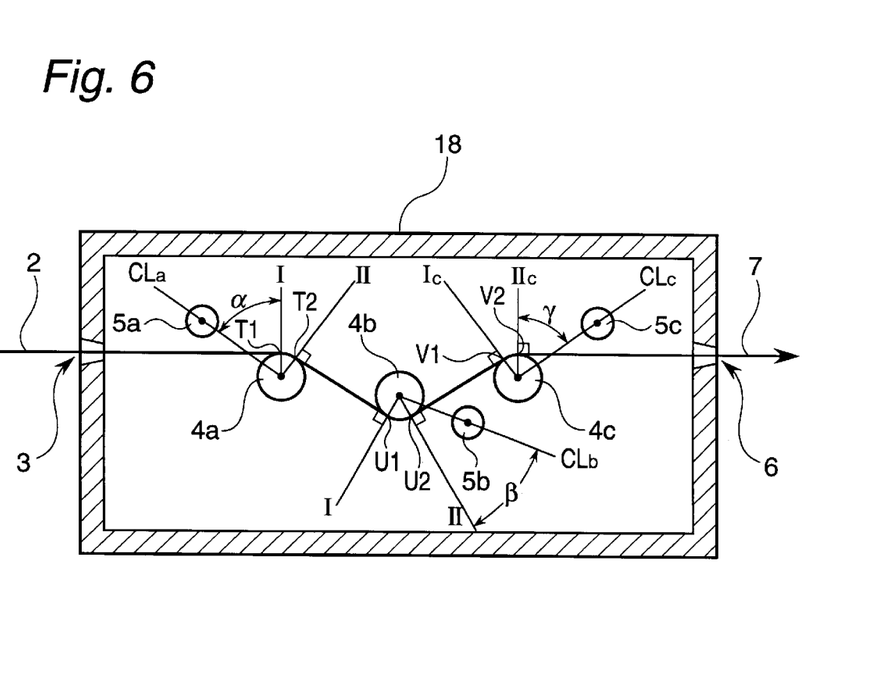
FIG. 6 is a schematic cross sectional view showing a fifth embodiment of the apparatus for opening and resin-impregnation according to the present invention.

FIG. 6 shows an opening and resin-impregnation apparatus (18) according to a fifth embodiment of the present invention as will be detailed in Example 7. Among the three sets of the opening pin (4) and the corresponding auxiliary pin (5) shown in FIG. 6, the auxiliary pin (5a) corresponding to the opening pin (4a) is moved toward the upstream side relative to the opening pin (4a) to thus form an angle of intersection (α) between the straight line (Ia) and the straight line (CLa); the auxiliary pin (5b) corresponding to the opening pin (4b) is moved toward the downstream side relative to the opening pin (4b) to thus form an angle of intersection (β) between the straight line (IIb) and the straight line (CLb); while the auxiliary pin (5c) corresponding to the opening pin (4c) is moved toward the downstream side relative to the opening pin (4c) to thus form an angle of intersection (γ) between the straight line (IIc) and the straight line (CLc). In FIG. 6, the angles of intersection (α), (β) and (γ) are all set at 45 deg.

Figure 7:
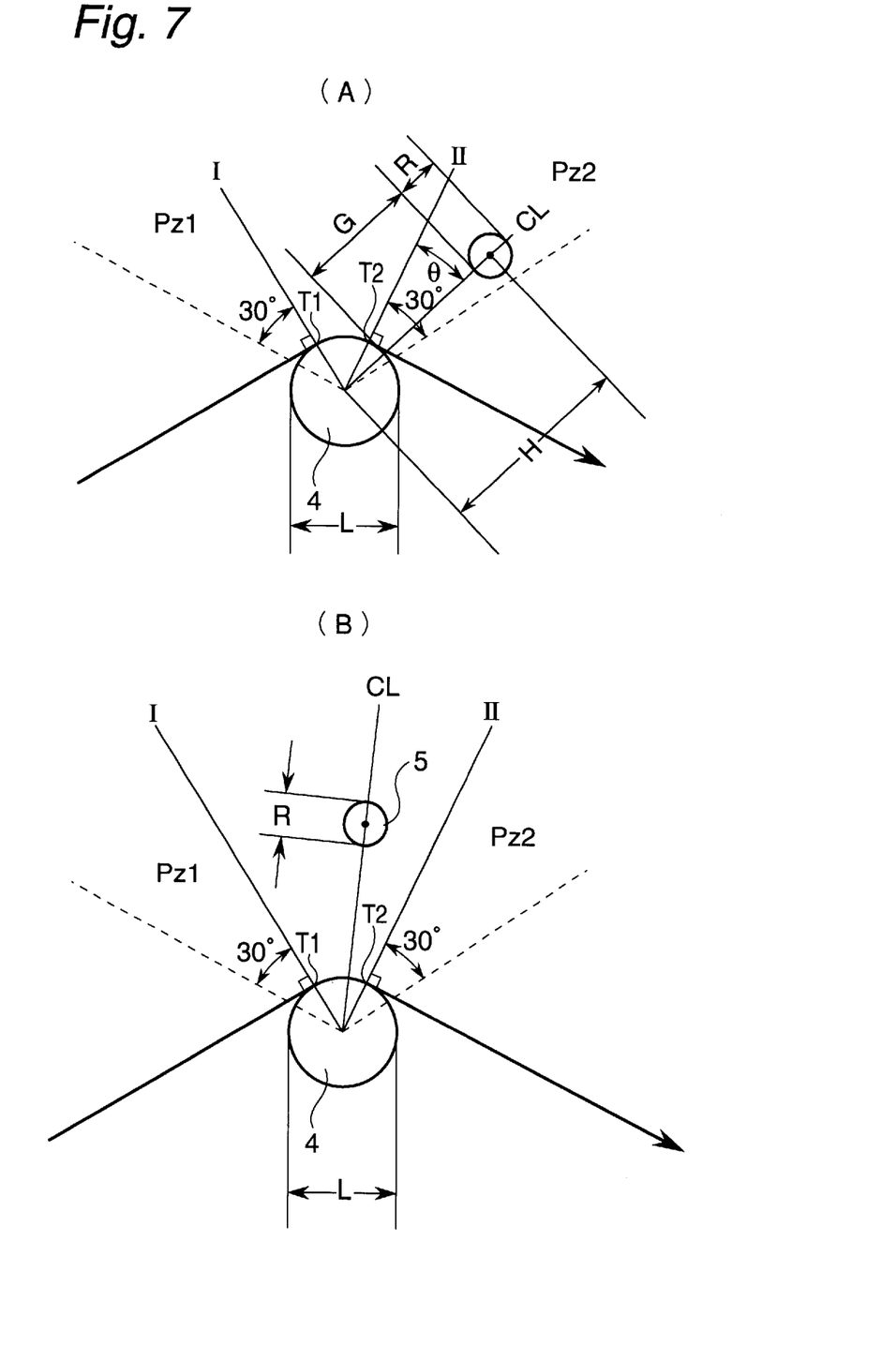
FIGS. 7(A) and 7B(B) are a schematic view, fragmentarily enlarged, for illustrating preferred relative positions of the opening pins, the auxiliary pins and the reinforcing fiber bundles in the apparatus for opening and resin-impregnation according to the present invention.

FIG. 7 is a schematic view, fragmentarily enlarged, for illustrating preferred relative positions of the members listed below, in the opening and resin-impregnation apparatus according to the present invention, and includes two figures, i.e., FIGS. 7A and 7B. More specifically, FIG. 7 shows the following interrelations between the position of the opening pin (4) relative to that of the corresponding auxiliary pin (5) constituting each apparatus (1), (11), (13), (14) or (18); the straight line (CL) connecting the center of the auxiliary pin (5) to that of the opening pin (4); the position (T1) at which the continuous fiber bundle (2) for reinforcing materials begins to come in contact with the surface of the opening pin and the position (T2) at which the continuous fiber bundle begins to depart from the surface; the angle of intersection θ (the details thereof include "α, β and γ") formed between the foregoing straight line (CL) and either the straight line (I) connecting the center of the opening pin (4) to the position (T1) or the straight line (II) connecting the center of the opening pin (4) to the position (T2), which is closer to the straight line (CL); the average diameter (La) of the opening pin (4); the average diameter (Ra) of the auxiliary pin (5); the average diameter (D) of the fibers constituting the the fiber bundle for reinforcing materials; the minimum surface-to-surface distance (G) between the opening pin (4) and the corresponding auxiliary pin (5) which form a pair; the center-to-center distance (H) between the opening pin (4) and the corresponding auxiliary pin (5) or the like, in the opening and resin-impregnation apparatus (1), (11), (13), (14) or (18).

The foregoing relative positions may roughly be divided into the following two kinds. More specifically speaking, there is also present an additional interrelation between the positions, i.e., an embodiment wherein the auxiliary pin (5) is positioned outside the straight line (I), but this embodiment corresponds to the reverse out of that shown in FIG. 7A, and accordingly, this embodiment is not depicted in a separate figure.

FIG. 7A shows an embodiment wherein the auxiliary pin (5) is positioned outside the fan-shaped region formed between the straight lines (I) and (II) (abbreviation: "embodiment outside of the fan-shaped region") and FIG. 7B shows an embodiment wherein the auxiliary pin (5) is positioned within the fan-shaped region enclosed by the straight lines (I) and (II) (abbreviation: "embodiment inside the fan-shaped region").

(Another Embodiment of the Present Invention)

In another embodiment of the opening and resin-impregnation apparatus according to the present invention, the auxiliary pin (5) corresponding to the opening pin (4) is positioned in such a manner that the predetermined range of the foregoing angle of intersection 0 (the details thereof include "α, β and γ") is embraced by the region enclosed by the straight lines (I) and (II) (embodiment within the small fan-shaped region) or embraced by a region enclosed by the straight line (I) or (II) and another straight line which is positioned outside the foregoing region and which forms an angle of not more than 30 deg. (incluside of 0 deg.) with respect to the straight line (I) or (II) (embodiment within the large fan-shaped region). In particular, the auxiliary pin (5) is preferably positioned within the region enclosed by the straight lines (I) and (II) (embodiment within the small fan-shaped region).

In the most preferred embodiment, wherein a plurality of auxiliary pins are present, all of the auxiliary pins (5) are disposed within the small fan-shaped region and in a preferred embodiment next thereto, (n−1) pins out of a plurality (n) of the auxiliary pins are disposed within the small fan-shaped region. In this respect, the degree of preference of a specific embodiment decreases as the number of pins disposed within the small fan-shaped region is reduced. However, preferred embodiments include those in which at least one auxiliary pin is disposed within the small fan-shaped region.

In addition to the foregoing, if the straight line (I) extends upward, the region defined by an angle from the line (I) of not more than 30 deg. in the counterclockwise direction is a left side "preferred region (PZ1)", while if the straight line (II) extends upward, the region defined by an angle from the line (II) of not more than 30 deg. in the clockwise direction is a right side "preferred region (PZ2)". If both the straight lines (I) and (II) exterd downward one must always be aware of the fact that the preferred regions are changed to one defined by an angle from the line (I) of not more than 30 deg. in the clockwise direction and one defined by an angle from the line (II) of not more than 30 deg. in the counterclockwise direction.

In the opening and resin-impregnation apparatus (1) according to the first embodiment of the present invention, the reinforcing fiber bundle (2) advances from the reinforcing fiber bundle-introduction opening (3) formed on the upstream (the left side on the figure) end wall (1wL) to the downstream side (the right side of the figure), while coming in contact with the opening pins (4) arranged in a zig-zag pattern. The reinforcing fiber bundles (2) are subjected to opening by bringing them into contact with the opening pins (4) and a molten resin simultaneously permeates into the spaces formed from the opening of fiber bundle (2) or the latter is impregnated with the molten resin. The reinforcing fiber bundles (2) thus impregnated with the resin is formed into a product having a predetermined sectional form by passing them through the shape-determining nozzle (6) positioned or formed on the boundary wall (1 wR) on the downstream side and then taken off by a take-off unit (not shown) positioned on the downstream side of the nozzle.

(Operation of the Invention)

In such an opening and resin-impregnation apparatus (1), (11), (13), (14) or (18), the reason why the opened fiber bundle-impregnation characteristics are considerably improved by placing auxiliary pins (5) in predetermined positions at which they do not come in contact with the reinforcing fiber bundles (2) has not yet been clearly elucidated. However, there would be strong reasons for concluding as follows. The molten resin which is entrained by the running reinforcing fiber bundles (2) and flows along the running direction of the fiber bundles (2) is appropriately interrupted by the opening pin (4) and the auxiliary pin (5) positioned above or below the former, separate vortexes are accordingly formed above and below the reinforcing fiber bundle (2) by the action of ascending molten resin flow and descending molten resin flow, each upwardly and downwardly reversed, respectively, and as a result, the vortexes of the molten resin would take part in the opening and the impregnation of the reinforcing fiber bundle.

Effects of the Invention

According to the present invention, the "impregnation characteristics" for the reinforcing fiber bundles can considerably be improved by disposing an auxiliary pin annexed to an opening pin in a specific position. In addition, the auxiliary pin does not come in contact with the reinforcing fiber bundle to be opened during the opening and resin-impregnation step, and accordingly the tension applied to the reinforcing fiber bundle to be opened is scarcely changed. Thus, any fluff is scarcely generated due to stability in the tension, even when the apparatus is operated at a high speed.

EXAMPLES

Examples will be detailed below in which continuous fiber-reinforced thermoplastic resin composite materials are produced using the apparatus for opening and resin-impregnation according to the present invention.

(1) Resin-Impregnation Characteristics

The resulting reinforced strands (or rods) or continuous fiber-reinforced resin composite materials were cut into pieces having a desired length of about 100 mm, followed by immersing a part of each piece (having a length of 10 mm from one end) in a solution of Methyl Red as a color-developing indicator in isopropanol (to 50 ml of a saturated Methyl Red solution in isopropanol, there was added 1 ml of hydrochloric acid to adjust the pH value of the liquid phase and to thus improve the color developing ability of Methyl Red) over 30 minutes and then the conditions of the ascended liquid level of the indicator solution was observed. The conditions observed for 10 samples were evaluated according to the following criteria: <<Criteria for Evaluation>>

| Evaluation | Conditions Observed |
| --- | --- |
| Excellent: | Any elevation of the liquid level was not observed for all of the samples examined. |
| Good: | An elevation of the liquid level was observed on a part of the cross section of not more than two samples. |
| Slightly Bad: | An elevation of the liquid level was observed on a part of the cross section of 3 to 10 samples. |
| Bad: | There was observed remarkable elevation of the liquid level over the entire cross section of all of the samples examined. |

(2) Flexural Strength

This property was determined according to JIS K-7203.

(3) Stable Productivity

Each apparatus was continuously operated for 4 hours at a take-off speed of 30 m/min, the reinforcing fiber bundles were inspected for the generation of fluff at the outlet of the shape-determining nozzle due to any fiber-breakage in the impregnation zone, followed by determining the fluff-generation times and evaluating the results thus obtained according to the following criteria:

| Evaluation | Fluff-Generation Times |
| --- | --- |
| Excellent | 0 |
| Good | less than 5 times |
| Slightly Bad | 5 to 10 times |
| Bad | not less than 11 times |
| Unacceptable | Operation was discontinued |

EXAMPLE 1

A continuous fiber-reinforced thermoplastic resin composite material was produced, using an opening and resin-impregnation apparatus (1) as shown in FIG. 1, by introducing, into the apparatus (1), 5 glass rovings (average single fiber diameter: 17 $\mu$m; tex number: 2310 g/km; number of bundled fibers: 4000) horizontally arranged side by side as the reinforcing fiber bundles (2) through a fiber-supply port (3) having an approximately slit-like sectional shape, which was formed on the upstream end wall (1 wL) of the apparatus (1) to thus pass the glass rovings through the apparatus (1) while simultaneously subjecting the glass rovings to opening and impregnation with a molten resin; and continuously taking off, from the downstream side, the continuous fiber-reinforced thermoplastic resin composite material through five shape-determining nozzles (61, 62, 63, 64 and 65) having an approximately circular section and arranged on the downstream end wall (1 wR).

During the above operation, the melt of a maleic anhydride-modified polypropylene (abbreviated as "M-PP"; crystal melting point (as determined by DSC): 160° C.; MFR (230° C.; 21.2 N): 130 g/10 min) was supplied to the apparatus (1) through an extruder (not shown) to thus sufficiently permeate the molten resin into the opened glass rovings simultaneously with the foregoing operations.

Each of the three opening pins (4a, 4b and 4c) used was a fixed round rod type one having an average diameter (La, Lb or Lc; average outer diameter) of 10 mm and each of the three auxiliary pins (5a, 5b and 5c) used herein and corresponding to the foregoing three opening pins was a fixed round rod type one having an average diameter (Ra, Rb or Rc; average outer diameter) of 6 mm. The minimum surface-to-surface distance (Ga, Gb or Gc) between the opening pin (4a, 4b or 4c) and the corresponding auxiliary pin (5a, 5b or 5c) which form a pair and the center-to-center distance (Ha, Hb or Hc) between the paired opening pin and auxiliary pin were all set at 1 mm (=60D). The interrelation between the positions of the paired pins and the distance between them were adjusted or determined as shown in FIG. 7B in detail.

More specifically, the positions of the auxiliary pins (5a, 5b and 5c) corresponding to the opening pins (4a, 4b and 4c) were established in such a manner that all of the auxiliary pins (5a, 5b and 5c) remained within the fan-shaped region formed between the straight lines (I) and (II).

The temperature of the opening and resin-impregnation apparatus (1) was controlled to 270° C. As the shape-determining nozzle (6), there were used five shape-determining nozzles (61, 62, 63, 64 and 65; inner diameter: 2.4 mm) which were approximately horizontally arranged in a row and the reinforcing fiber bundles (2) were passed through the shape-determining nozzles (6) in a proportion of one bundle/nozzle. The taking off speed of the resulting continuous fiber-reinforced thermoplastic resin composite material was set at 30 m/min.

Fluff was not generated at all during operation the opening and resin-impregnation apparatus (1), and therefore the stable productivity of the apparatus was graded to be "excellent". The glass contents of the resulting five kinds of continuous fiber-reinforced thermoplastic resin composite strands (71, 72, 73, 74 and 75; abbreviated as "reinforced strands") was each found to be 40 wt %, and the impregnation characteristics thereof with the molten resin were all graded to be "excellent".

Pellets obtained by cutting (or pelletizing) these reinforced strands (7) into pieces having a length of 10 mm were introduced into an injection molder to form test pieces (each having a size of 100 mm (length)×10 mm (width)×4 mm (thickness)). The test piece was found to have a flexural strength of 225 MPa. These results are summarized in the following Table 1.

EXAMPLE 2

An opening and resin-impregnation apparatus (pultrusion apparatus) which was identical to the opening and resin-impregnation apparatus (1) as shown in FIG. 1, except that two auxiliary pins (5a and 5c) out of the three auxiliary pins (5a, 5b and 5c) were removed, while only the remaining central pin (5b) was used in the opening and resin-impregnation apparatus (11; depicted in FIG. 2). In this apparatus (11), the position of the only auxiliary pin (5b) relative to the opening pin (4b) was established as follows. The interrelation between the positions of the paired pins and the distance therebetween were adjusted or determined as shown in FIG. 7B in detail. More specifically, the position of the auxiliary pin (5b) corresponding to the opening pin (4b) was established in such a manner that the auxiliary pin (5b) remained within the fan-shaped region formed between the straight lines (I) and (II).

The same procedures used in Example 1 were repeated under the same conditions used in Example 1 except for using the apparatus (11) to give reinforced strands (7), followed by determining the impregnation characteristics thereof. At the same time, the reinforced strands each was cut to form reinforced pellets, followed by injection-molding the pellets by the same procedures used in Example 1 to give each test piece and inspection of the test piece for the properties. The formation of fluff was not observed at all during the operation of the foregoing apparatus for producing the foregoing reinforced strands (7), and the impregnation characteristics of the resulting reinforced strands (7) and the flexural strength of the test pieces were all found to be satisfactory. These results are listed in Table 1.

EXAMPLE 3

An apparatus (12), which was identical to the opening and resin-impregnation apparatus (1) as shown in FIG. 1, except that the minimum surface-to-surface distance (Ga, Gb or Gc) between the opening pin (4a, 4b or 4c) and the corresponding auxiliary pin (5a, 5b or 5c) was adjusted to 6.8 mm (=400D) for all the three pairs, was used as a opening and resin-impregnation apparatus (12; not shown). In this respect, the interrelation between the positions of the paired pins and the distance therebetween were adjusted or determined as shown in FIG. 7B in detail.

More specifically, the positions of the auxiliary pins (5a, 5b and 5c) corresponding to the opening pins (4a, 4b and 4c) were established in such a manner that all of the auxiliary pins (5a, 5b and 5c) remained within the fan-shaped region formed between the straight lines (I) and (II).

The same procedures used in Example 1 were repeated under the same conditions used in Example 1 except for using the apparatus (12) to give reinforced strands (7), followed by the preparation of reinforced pellets and inspection of test pieces obtained from the pellets for the properties.

The formation of fluff was not observed at all during the operation of the apparatus for producing the foregoing reinforced strands (7), and the impregnation characteristics of the resulting reinforced strands (7) and the flexural strength of the test pieces were all found to be satisfied. These results are listed in Table 1.

EXAMPLE 4

There was used, in this Example, an apparatus (13) which was identical to the opening and resin-impregnation apparatus (1) as shown in FIG. 1, except that all of the three opening pins (4a, 4b and 4c) were changed to fixed round-rod type ones, all of the average diameters (La, Lb and Lc) thereof were changed to 6 mm and the corresponding three auxiliary pins (5a, 5b and 5c) were changed to those each having an average diameter (Ra, Rb or Rc) of 10 mm for the opening and resin-impregnation apparatus (13; depicted in FIG. 3). Moreover, the minimum surface-to-surface distance (Ga, Gb or Gc) between the opening pin (4a, 4b or 4c) and the corresponding auxiliary pin (5a, 5b or 5c) was adjusted to 1 mm (=60D) for all the three pairs. In this respect, the interrelation between the positions of the paired pins and the distance therebetween were adjusted or determined as shown in FIG. 7B in detail.

More specifically, the positions of the auxiliary pins (5a, 5b and 5c) corresponding to the opening pins (4a, 4b and 4c) were established in such a manner that all of the auxiliary pins (5a, 5b and 5c) remained within the fan-shaped region formed between the straight lines (I) and (II).

The same procedures used in Example 1 were repeated under the same conditions used in Example 1 except for using the apparatus (13) to give reinforced strands (7), followed by the preparation of reinforced pellets and inspection of test pieces obtained from the pellets for the properties.

The formation of fluff was not observed at all during the operations of the apparatus (13), and the impregnation characteristics of the resulting reinforced strands (7) and the flexural strength of the test pieces were all found to be satisfied. These results are listed in Table 1.

EXAMPLE 5

The same procedures used in Example 1 were performed under the same conditions used therein, except that a opening and resin-impregnation apparatus (11) shown in FIG. 2, modified as detailed below, was used as the opening and resin-impregnation apparatus (14; depicted in FIG. 4) to produce reinforced strand (7) and reinforced pellets, followed by inspection of test pieces obtained from the resulting reinforced pellets for their properties.

In the apparatus (14) shown in FIG. 4, three auxiliary pins (5a, 5b and 5c) all each disposed in a position which is in proximity to the line (Ia, Ib or Ic) drawn from the center of the corresponding opening pin (4a, 4b or 4c) toward the point (T1, U1 or V1) at which the reinforcing fiber bundle (2) for the reinforced material begins to come in contact with the pin on each corresponding surface, making an angle, from the corresponding straight line to the upstream side (counterclockwise direction on this figure), of 20 deg. (i.e., $\alpha=\beta=\gamma=20$ deg.).

In addition, all of the opening pins (4a, 4b and 4c) used herein are fixed round rod type ones having average diameters (La, Lb and Lc) equal to 10 mm, while all of the three auxiliary pins (5a, 5b and 5c) used herein are also fixed round rod type ones having average diameters (Ra, Rb and Rc) equal to 6 mm. Each minimum surface-to-surface distance (Ga, Gb or Gc) between the opening pin (4a, 4b or 4c) and the corresponding auxiliary pin (5a, 5b or 5c) was set at 2 mm (=120D) for all of these three pairs. In this respect, the interrelation between the positions of the paired pins and the distance therebetween were adjusted or determined as shown in FIG. 7A in detail.

More specifically, the positions of the auxiliary pins (5a, 5b and 5c) corresponding to the opening pins (4a, 4b and 4c) were selected in such a manner that all of the auxiliary pins (5a, 5b and 5c) were positioned outside the fan-shaped region formed between the straight lines (I) and (II).

The formation of fluff was not observed at all during the operation of the apparatus (14), and the impregnation characteristics of the resulting reinforced strands (7) and the flexural strength of the test pieces produced from the reinforced pellets by the same procedures and under the same conditions used in Example 1 were all found to be satisfied. These results are listed in Table 1.

EXAMPLE 6

In this Example, using the opening and resin-impregnation apparatus (1) shown in FIG. 1 as an opening and resin-impregnation apparatus (15; not shown), five glass fiber rovings (21, 22, 23, 24 and 25) (average single fiber diameter: 17 μm; tex No.: 2310 g/km; the number of bundled fibers: 4000) as the reinforcing fiber bundles (2), which were horizontally arranged, were supplied in parallel to the apparatus (1) through the slit-like reinforcing fiber bundle-introduction opening (3). The fiber bundles were subjected to opening and resin-impregnation in the apparatus (1) and the opened fiber bundles were continuously taken off on the downstream side, while a melt of a modified polypropylene (modified product of maleic anhydride (M-PP); crystal melting point (as determined by DSC measurement): 160° C.; MFR (230° C., 21.2N): 130 g/10 min) was fed to the apparatus (1) through an extruder (not shown) to thus sufficiently impregnate the opened continuous fibers with the molten resin (or sufficiently permeate the molten resin into spaces formed between the opened continuous fibers).

All of the three opening pins (4a, 4b and 4c) herein used were fixed round rod type ones having average diameters (La, Lb and Lc) equal to 10 mm, while all of the corresponding three auxiliary pins (5a, 5b and 5c) herein used were also fixed round rod type ones having average diameters (Ra, Rb and Rc) equal to 6 mm.

Moreover, the minimum surface-to-surface distance (Ga, Gb or Gc) between the opening pin ((4a, 4b or 4c) and the corresponding auxiliary pin (5a, 5b or 5c) was set at 1 mm (=60D) for all of these three pairs. The temperature in the opening and resin-impregnation apparatus (1) was adjusted to 270° C. In this respect, the interrelation between the positions of the paired pins and the distance therebetween were adjusted or determined as shown in FIG. 7B in detail.

More specifically, the positions of the auxiliary pins (5a, 5b and 5c) corresponding to the opening pins (4a, 4b and 4c) were established in such a manner that all of the auxiliary pins (5a, 5b and 5c) remained within the fan-shaped region formed between the straight lines (I) and (II).

A circular nozzle having an inner diameter of 4 mm was used as the single shape-determining nozzle (3) and all of the five reinforcing fiber rovings (21, 22, 23, 24 and 25) were centered at and passed through the single nozzle (3) to thus form into a single reinforced strand (2; synonym: "reinforced rod") while taking off the reinforced rod. The taking off speed was set at 20 m/min.

It was confirmed that fluff was not generated at all during operation of the opening and resin-impregnation apparatus (15), and therefore the stable productivity of the apparatus (15) was graded to be "excellent". The glass contents of the resulting reinforced rod (7) was found to be 61 wt %. The reinforced rod was used, without any treatment, in the measurements of impregnation characteristics and flexural strength and they were all found to be satisfactory. These results are listed in Table 1.

Comparative Example 1

The opening and resin-impregnation apparatus (16; not shown) herein used was identical to the opening and resin-impregnation apparatus (1) shown in FIG. 1 except for removing all of the three auxiliary pins (5). The same procedures used in Example 1 were repeated under the same conditions used in Example 1 except for using the opening and resin-impregnation apparatus (16) to give a reinforced strand (7), and reinforced pellets were produced by cutting the resulting strand into pieces. Then the former was inspected for the impregnation characteristics and the latter was formed into test pieces whose flexural strength was then determined.

It was confirmed that fluff was not generated at all during operation of the opening and resin-impregnation apparatus (16), but the impregnation characteristics of the reinforced strand (7) and the flexural strength of the test pieces were found to be insufficient. These results are summarized in Table 1.

Comparative Example 2

The apparatus shown in FIG. 5 was used as an opening and resin-impregnation apparatus (17), and the same procedures used in Example 1 were repeated under the same conditions used therein to give a reinforced strand (7) and reinforced pellets were produced from the strand. Then the former was inspected for the impregnation characteristics and the latter was formed into test pieces to determine the flexural strength thereof.

In the opening and resin-impregnation apparatus (17) used herein, the number of the opening pins were increased to 6 to thus improve the impregnation characteristics of the former and the flexural strength of the latter. However, this apparatus (17) was free of any auxiliary pin. Accordingly, the apparatus in fact permitted improvement in the impregnation characteristics and the flexural strength as discussed above, but conversely the stable productivity thereof was considerably reduced. These results are listed in Table 1.

EXAMPLE 7

The same procedures used in Example 1 were repeated under the same conditions used therein except for using the apparatus shown in FIG. 6 as an opening and resin-impregnation apparatus (18) to form a reinforced strand (7) and reinforced pellets, and the former was inspected for impregnation characteristics and the latter was formed into test pieces to determine the flexural strength thereof.

In the opening and resin-impregnation apparatus (18) shown in FIG. 6, the auxiliary pin (5a) on the upstream side among the three auxiliary pins (5) is shifted toward the upstream side and is disposed in a position which is in proximity to the line (Ia) drawn from the center of the opening pin (4a) toward the point (T1a) at which the reinforcing fiber bundles (2) begin to come in contact with the opening pin on its surface and which makes an angle, from the straight line (Ia) toward the upstream side (counterclockwise direction on the figure), of 45 deg. (α=45 deg.).

On the other hand, the central auxiliary pin (5b) and the auxiliary pin (5c) on the downstream side are both shifted toward the downstream side and are disposed in positions which are in proximity to the lines (IIb and IIc) drawn from the centers of the opening pins (4b and 4c) toward the respective points (T2b and T2c) at which the reinforcing fiber bundle (2) for the reinforced material begins to depart from the respective pins on the respective surfaces and which make an angle, from the corresponding straight lines (IIb and IIc) towards the downstream side, of 45 deg. (i.e., β45 deg.; γ=45 deg.). Each minimum surface-to-surface distance (G) between the opening pin (4) and the corresponding auxiliary pin (5) was set at 5.1 mm (300D) for all of the three pairs. Moreover, the interrelation between the positions of the paired pins and the distance therebetween were adjusted or determined as shown in FIG. 7A in detail.

More specifically, the positions of the auxiliary pins (5a, 5b and 5c) corresponding to the opening pins (4a, 4b and 4c) were selected in such a manner that all of the auxiliary pins (5a, 5b and 5c) were positioned outside the fan-shaped region formed between the straight lines (I) and (II).

It was confirmed that fluff was not generated at all during operation of the opening and resin-impregnation apparatus (18), and therefore stable productivity of apparatus (18), and therefore stable productivity of the apparatus (18) was graded to be "excellent". Moreover, it was found that both the impregnation characteristics of the reinforced strand was graded to be "good" and the flexural strength of the test piece obtained from the reinforced pellets was fairly high. These results are summarized in Table 1.

EXAMPLE 8

The opening and resin-impregnation apparatus (19; not shown) herein used was identical to the apparatus (1) shown in FIG. 1, provided that the minimum surface-to-surface distance (Ga, Gb or Gc) between the opening pin (4a, 4b or 4c) and the corresponding auxiliary pin (5a, 5b or 5c)-was adjusted to 0.1 mm (=6D) for all of the three pairs. In this respect, the interrelation between the positions of the paired pins and the distance therebetween were adjusted or determined as shown in FIG. 7B in detail.

In addition, the auxiliary pins (5a, 5b and 5c) corresponding to the opening pins (4a, 4b and 4c) were positioned in such a manner that all of the auxiliary pins (5a, 5b and 5c) remained within the fan-shaped region formed between the straight lines (I) and (II).

The same procedures used in Example 1 were repeated under the same conditions used therein, except for using the foregoing opening and resin-impregnation apparatus (19) to form a reinforced strand (7) and reinforced pellets, and the former was inspected for the impregnation characteristics and the latter was formed into test pieces to determine the flexural strength.

As a result, it was found that the glass rovings (2) accidentally came in contact with the opening pins (4) during the operations of the apparatus (19), but the stable productivity of the apparatus was found to be almost satisfactory. Moreover, it was confirmed that the impregnation characteristics of the reinforced strand was graded to be "excellent" and the flexural strength of the test piece obtained from the reinforced pellet was fairly high. The results obtained are summarized in Table 1.

EXAMPLE 9

The opening and resin-impregnation apparatus (20; not shown) herein used was identical to the apparatus (1) shown in FIG. 1, provided that the minimum surface-to-surface distance (Ga, Gb or Gc) between the opening pin (4a, 4b or 4c) and the corresponding auxiliary pin (5a, 5b or 5c) was adjusted to 10.2 mm (=600D) for all of the three pairs. In this respect, the interrelation between the positions of the paired pins and the distance therebetween were adjusted or determined as shown in FIG. 7B in detail.

More specifically, the auxiliary pins (5a, 5b and 5c) corresponding to the opening pins (4a, 4b and 4c) were positioned in such a manner that all of the auxiliary pins (5a, 5b and 5c) remained within the fan-shaped region formed between the straight lines (I) and (II).

The same procedures used in Example 1 were repeated under the same conditions used therein, except for using the opening and resin-impregnation apparatus (20) to form a reinforced strand (7) and reinforced pellets, and the former was inspected for the impregnation characteristics and the latter was formed into test pieces to determine the flexural strength.

It was confirmed that any fluff was not generated at all during operation of the opening and resin-impregnation apparatus (20), and therefore stable productivity of the apparatus (20) was graded to be "excellent". Moreover, it was confirmed that the impregnation characteristics of the reinforced strand was graded to be "good" and the flexural strength of the test piece obtained from the reinforced pellet was fairly high. These results are summarized in Table 1.

TABLE 1

| Contents of examples | Production conditions and results | | | Properties of fiber-reinforced pellets | |
|---|---|---|---|---|---|
| | G/D | Stable productivity | Reinforcing glass content (wt %) | Impregnation characteristics [1] | Flexural strength (MPa) |
| Example 1 | 60 | Excellent | 40 | Excellent | 225 |
| Example 2 | 60 | Excellent | 40 | Good | 201 |
| Example 3 | 400 | Excellent | 41 | Good | 197 |
| Example 4 | 60 | Excellent | 40 | Excellent | 220 |
| Example 5 | 120 | Excellent | 40 | Excellent | 205 |
| Example 6 | 60 | Excellent | 61 | Excellent | 406* |
| Example 7 | 300 | Excellent | 41 | Good | 167 |
| Example 8 | 6 | Good | 40 | Excellent | 207 |
| Example 9 | 600 | Excellent | 41 | Good | 167 |
| Comparative Example 1 | — | Excellent | 42 | Bad | 144 |
| Comparative Example 2 | — | Bad | 40 | Excellent | 217 |

G: This represents the surface-to-surface distance between an opening pin and an auxiliary pin which form a pair and is equal to H − M;
D: Average diameter of single fibers constituting a roving;
H: Center-to-center distance between an opening pin and an auxiliary pin which form a counterpart to each other;
M: This means 0.5 (Lx + Rx), wherein Lx represents an average diameter of an opening pin (x) and Rx an average diameter of an auxiliary pin (x).
G/D: Ratio of the surface-to-surface distance between an opening pin and an auxiliary pin to D.
*Comparative Example

What is claimed is:

1. A method for opening and resin impregnation of a reinforcing fiber bundle, comprising passing the fiber bundle along a path through a bath which has a combined system of at least one opening pin and at least one auxiliary pin so as to cause opening and resin impregnation of the reinforcing fiber bundle, including:
   passing the reinforcing fiber bundle in contact with one opening pin of the at least one opening pin that is disposed so that a fan shaped region, as seen in cross-section, is formed between a first straight line extending from the center of the one opening pin through a point on the surface of the one opening pin at which the reinforcing fiber bundle begins to come in to contact with the surface and a second straight line extending from the center of the one opening pin through a point on the surface of the one opening pin at which the fiber bundle begins to depart from the surface of the one opening pin; and
   passing the reinforcing fiber bundle by one auxiliary pin of the at least one auxiliary pin and corresponding to the one opening pin, the one auxiliary pin being located so that the one auxiliary pin is opposite to the one opening pin with the reinforcing fiber bundle therebetween, so that the one auxiliary pin is free of contact with any reinforcing fiber bundle passing through said bath, and so that the center of the one auxiliary pin is positioned within an area defined by the fan shaped region and regions on both sides of the fan shaped region formed between the first straight line and a third straight line extending from the center of the opening pin at no more than a 30 degree angle to the first straight line and between the second straight line and a fourth straight line extending from the center of the opening pin at no more than a 30 degree angle to the fourth straight line.

\* \* \* \* \*